United States Patent [19]

Fujii

[11] 4,124,421

[45] Nov. 7, 1978

[54] METHOD OF PRODUCING MULTI-LAYERED AND SHAPED WALL COVERING MATERIAL OF CORRUGATED CARDBOARD

[75] Inventor: Toshihiko Fujii, Yokohama, Japan

[73] Assignee: Nissan Motor Company, Ltd., Japan

[21] Appl. No.: 765,586

[22] Filed: Feb. 4, 1977

[30] Foreign Application Priority Data

Feb. 5, 1976 [JP] Japan .................................. 51-10809

[51] Int. Cl.$^2$ ............................................. B29C 3/00
[52] U.S. Cl. ....................................... 156/87; 156/221;
156/245; 156/286; 156/382; 156/581; 156/583
[58] Field of Search ............... 156/245, 221, 222, 223,
156/224, 207, 228, 285, 286, 382, 470, 471, 87,
212, 206, 208, 252, 253, 580, 581, 583; 264/90,
101, 102; 425/352, 355, 387 R, 388, 405 R, 405
H, 410, 406, 412, 415, 416, 420

[56] References Cited

U.S. PATENT DOCUMENTS

| | | | |
|---|---|---|---|
| 1,433,971 | 10/1922 | Roberts .................................. | 156/87 |
| 2,590,221 | 3/1952 | Stevens .................................. | 156/224 |
| 2,986,777 | 6/1961 | Carter .................................. | 264/101 |
| 3,484,510 | 12/1969 | Coraza .................................. | 264/101 |
| 3,657,044 | 4/1972 | Singer .................................. | 156/212 |
| 3,920,371 | 11/1975 | Faller .................................. | 425/388 |

Primary Examiner—Caleb Weston

[57] ABSTRACT

A method of producing a shaped wall covering material composed of a corrugated cardboard substrate, a porous buffer layer adhered onto one side of the substrate and a thermoplastic resin liner coated on the outer surface of the buffer layer. The starting materials are set in a hot-press in an orderly piled arrangement with interposed adhesive materials and subjected to press-shaping between male and female dies with application of heat. During the shaping operation, air is sucked from the gap between the substrate and the shaped surface of one die through holes intentionally formed in this die. The resultant attraction of the piled materials to this die facilitates the shaping and prevents a layer-separation or deformation of the product attributable to a sticking tendency of the liner to the other die. The suction can be enhanced by forming pin-like protuberances on the die surface contacting the substrate to intrude into the buffer layer and squeezing the buffer layer and/or substrate in a marginal region by a peripheral wall-like protuberance formed, for example, on the other die surface.

7 Claims, 5 Drawing Figures

METHOD OF PRODUCING MULTI-LAYERED AND SHAPED WALL COVERING MATERIAL OF CORRUGATED CARDBOARD

This invention relates to a method of producing a wall covering material which is composed of a corrugated cardboard sheet as a substrate, a buffer layer of a porous material applied onto one side of the substrate and a thermoplastic resin liner covering the outer surface of the buffer layer.

In the field of wall covering materials to afford comforts and/or decorative effects to the interior of rooms of buildings, cabins of ships and passenger compartments of cars, there is a growing trend towards the use of corrugated cardboard as a basic material because of its light weight, low cost, good heat and sound insulating ability and tolerable formability. However, corrugated cardboard is seldom used singularly as a wall covering material. It is a usual way to utilize corrugated cardboard in the form of a composite and multilayered sheet material which is composed of a corrugated cardboard substrate, a heat-insulating and cushioning layer or buffer layer of a porous material such as nonwoven cloth or foam plastics applied onto one side of the substrate and a protective and decorative layer or outer liner of a thermoplastic resin coated on the outer surface of the buffer layer.

In application to walls (including ceiling) having a curved surface as is usual in passenger compartments of automobiles, this type of wall covering material needs to be warped or shaped at production stage so as to have a curved surface which mates with the curved wall surface. It is required that the shaping work be accomplished without causing wrinkles or cracks in the decorative resin layer which is to be exposed to the interior of, for example, an automobile passenger compartment. It is also necessary that the shape of the product be exactly as intended without any deformation or internal distortion. However, it is difficult to fully meet these requirements by conventional methods of producing a shaped wall covering material of the described type.

To aid the understanding of the invention, a typical conventional production method will be outlined with reference to part of the accompanying drawings.

Figure 1:
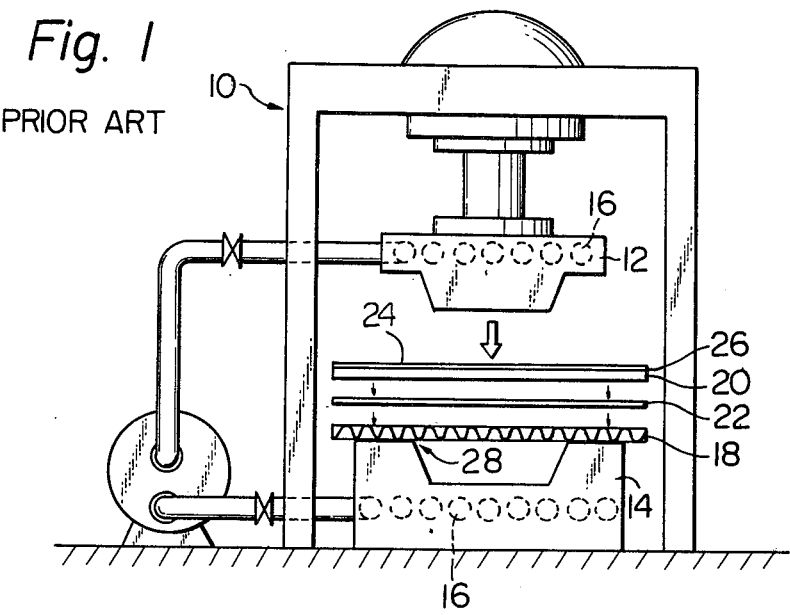
FIG. 1 is an elevational view showing a conventional hot-press method of producing a shaped wall covering material of corrugated cardboard base.

In FIG. 1, a hot-press 10 has a movable male die 12 and a stationary female die 14 both provided with heater elements 16. A flat sheet 18 of corrugated cardboard, which is made of fibrous materials and composed of a corrugated medium and two outer liners, is placed on the female die 14. A porous buffer layer 20 of a heat-insulating and cushioning material, which is usually nonwoven cloth or foam plastics, is laid on the exposed side of the corrugated cardboard 18 interposing therebetween a hot-melt sheet 22. An outer liner 24 of a thermoplastic resin is laid on the outer (upper in FIG. 1) surface of the buffer layer 20 interposing therebetween an adhesive layer indicated at 26. Usually, the liner 24 is preliminarily attached to the buffer layer 20 by the adhesive 26 in advance of the press-shaping work. The dies 12 and 14 have been heated to differently preset temperatures to soften the liner 24 and melt the hot-melt sheet 22 and the adhesive 26. For example, the male die 12 which contacts the liner 24 is kept at about 100° C. and the female die 14 at about 160° C. In this state, the male die 12 is lowered to shape the piled sheet materials as a whole.

Figure 2:
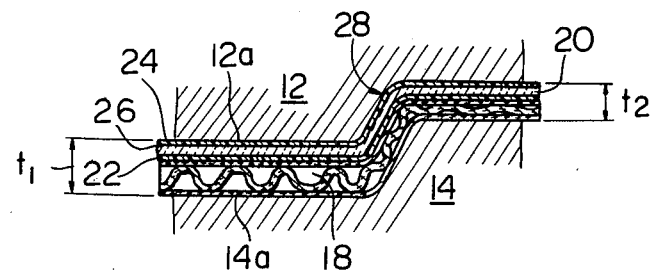
FIG. 2 is a fragmentarily enlarged sectional view of the wall covering material under shaping in the apparatus of FIG. 1.

FIG. 2 shows a state of the piled sheet materials after the completion of the downward movement of the male die 12 for shaping. In this state, the clearance between the shaped (lower end) surface 12a of the male die 12 and the shaped (upper end) surface 14a of the female die 14 is not always strictly uniform over the entire areas. In the illustrated case, the clearance is $t_1$ in a shaped (central) region but takes a smaller value $t_2$ in a flat and marginal region. As a result, the shaping and adhering operation is accomplished with an insufficient pressure in the shaped region of the die surfaces 12a and 14a, causing an incomplete adhesion of the buffer layer 20 to the substrate 18. In parting the male die 12 from the shaped material, the thermoplastic liner 24 is liable to stick to the die surfaces 12a particularly in a region indicated at 28 where the material has been subjected to deep drawing. Accordingly, the adhesion between the buffer layer 20 and the liner 24 and/or the substrate 18 is liable to locally break particularly when the press-shaping was accomplished with a substantial dispersion of pressure caused by the aforementioned reason. Even when no separation occurs between the adhered surfaces of the material, the sticking of the liner 24 to the die surface 12a sometimes causes a deformation or an internal distortion of the shaped material and/or wrinkles or cracks in the liner 24.

It is an object of the present invention to remedy such shortcomings of conventional methods for the production of a multi-layered and shaped wall covering material of the described type.

It is another object of the invention to provide an improved hot-press method for the production of a wall covering material of the described type, which method does not suffer from an incomplete adhesion between the piled layers in the product even if a strictly uniform shaping pressure is not realized in a pressing operation.

It is a still another object of the invention to provide an improved hot-press method for the production of a wall covering material of the described type, in which method the parting of the molds or dies can be accomplished without causing any layer-separation, internal distortion or deformation of the product.

It is still further object of the invention to provide a hot-press method for the production of a wall covering material of the described type, in which method piled sheet materials are intimately contacted with the surface of a female or male die in a shaped region and firmly held between male and female dies in a marginal region, so that the shaping operation can stably and precisely be accomplished even when the piled materials are subjected to deep drawing in the shaping operation.

According to the invention, one of male and female dies in a hot-press, which die is intended to contact a corrugated cardboard substrate, is modified to have a plurality of holes formed therein to establish fluid communication between the shaped surface of this die and a separate suction apparatus. The substrate, a heat-insulating and cushioning layer of a porous material and an outer liner of a thermoplastic resin are set in the hot-press in an orderly piled arrangement with adhesive materials interposed therebetween, and the dies are heated to temperatures suitable for shaping of the piled materials and function of the adhesive materials. Then piled materials are press-shaped between the dies to simultaneously accomplish the adhesion of the cushioning layer to the substrate and the outer liner. At this stage, air is sucked through the holes formed in the aforementioned die, so that the piled materials are attracted to this die. Then, continuing the suction, the other die is parted from the outer liner.

Due to the attraction of the shaped product to the die contacting the substrate, the die parting does not cause any layer-separation, deformation or development of wrinkles or cracks in the shaped product even though the outer liner has a sticking tendency to the contacted die surface.

To enhance the attraction of the piled materials to the die contacting the substrate, a plurality of pin-like protuberances are preferably formed on the shaped surface of this die in such shape and size that a tip portion of each protuberance perforates the substrate and intrudes into the cushioning layer but does not arrive at the outer liner. Then air can be sucked also from voids in the cushioning layer through the perforated substrate.

Furthermore, either the cushioning layer or the substrate is preferably squeezed into the other (or both into each other) in a marginal region along the entire periphery of the piled materials at the press-shaping stage by forming a peripheral wall-like protuberance on the shaped surface of either (or both) of the two dies. Then the inflow of air from the atmosphere into voids in the cushioning layer and substrate across peripheral sides of these materials can almost completely be prevented.

The invention will fully be understood from the following detailed description of a preferred embodiment with reference to the drawings.

Figure 3:
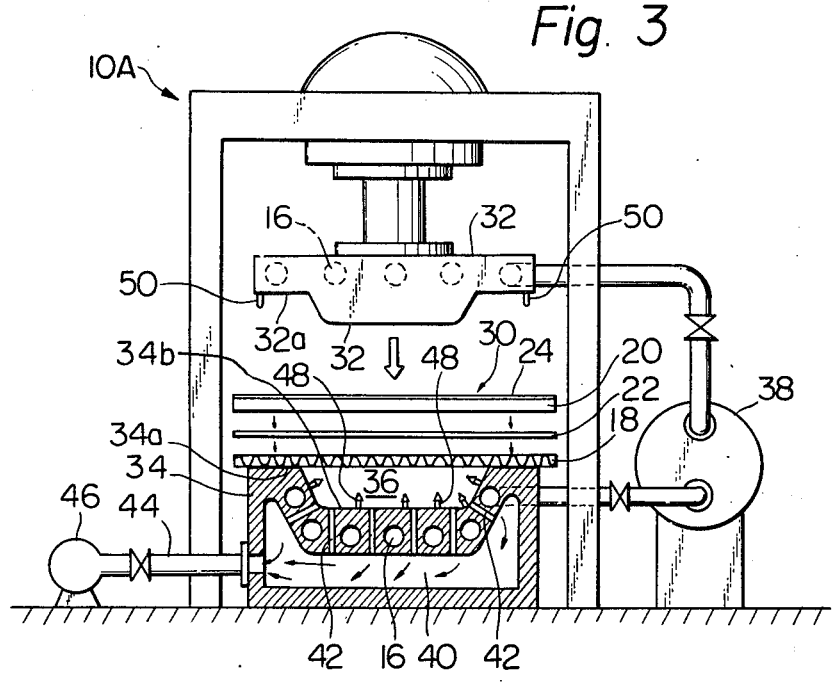
FIG. 3 is an elevational and partly sectional view showing a method according to the invention for the production of the same wall covering material by the use of a modified hot-press.

Referring to FIG. 3, a method of the invention uses a hot-press 10A having a movable male die 32 and a stationary female die 34, both devised as will hereinafter be described in detail. The sheet materials to compose a multi-layered wall covering material is not different from those which are used in the above described conventional method. The corrugated cardboard substrate 18 is placed on the upper surface 34a of the female die 34. This surface 34a is shaped or recessed in a region indicated at 34b so that a cavity 36 is formed between the surface 34b and the rear (lower) side of the substrate 18. The hot-melt sheet 22 is laid on the substrate 18. The buffer layer 20 which has already been coated with the liner 24 is indicated at 30 (the adhesive for the preparation of this laminated layer 30 is omitted from the illustration). This layer 30 is placed on the hot-melt sheet 22 with the liner 24 outside to face the shaped (lower) surface 32a of the male die 32. A shaped or projected region of this surface 32a is indicated at 32b.

A temperature of about 160° C. is usually suitable for the shaping of the corrugated cardboard substrate 18. Accordingly, the material of the hot-melt 22 is preferably a synthetic resin such as nylon which melts at about 110°–160° C. while the material of the buffer layer 20 has preferably a softening point of about 80° C. and a melting point of about 180° C. as typified by polyester resins. The material of the liner 24 is a thermoplastic resin, for example, polyvinyl chloride, which softens at a temperature chosen for the shaping of the substrate 18 at the highest but preferably by several tens degrees below this temperature. The substrate 18 and the buffer layer 20, which is porous as described hereinbefore are gas permeable, but the liner 24 is preferably inpermeable.

Figure 4:
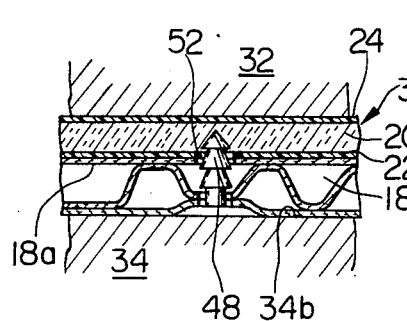
FIG. 4 is a fragmentarily enlarged sectional view of the wall covering material under shaping in the apparatus of FIG. 3.

Both the male die 32 and the female die 34 are provided with the heater elements 16 which are, for example, pipes connected to a hot-fluid supply 38. The female die 34 is made hollow so as to define therein a space 40 below the heater elements 16, and a plurality of holes 42 of a small cross-sectional area are formed to establish fluid communication between this space 40 and the die cavity 36. A duct 44 connects the space 40 to a suction apparatus 46 such as a vacuum pump. A plurality of sharp-pointed tiny protuberances 48 are formed on the shaped surface 34b (shaped region) of the female die 34 towards the substrate 18 placed thereon. These protuberances 48 have a height larger than the thickness of the substrate 18 but smaller than the total thickness of the substrate 18 and the buffer layer 20. Accordingly, these protuberances 48 intrude into the buffer layer 20 across the substrate 18 when the sheet materials are pressed against the die surface 34b but do not contact the liner 24. These protuberances 48 do not take the form of an evenly tapered pin. Their diameter continuously increases from the sharp-pointed tip but exhibits an abrupt decrease at a short distance from the tip. Then the diameter resumes a continuous increase towards the die surface 34b. The abrupt decrease in diameter may be repeated several times so that the protuberances 48 may take the form of an axial assembly of several conical members and have a saw-toothed longitudinal section as seen in FIG. 4. Alternatively, the protuberances 48 may take the form of a conical member only in a tip portion and a thin cylinder in the remaining portion.

Figure 5:
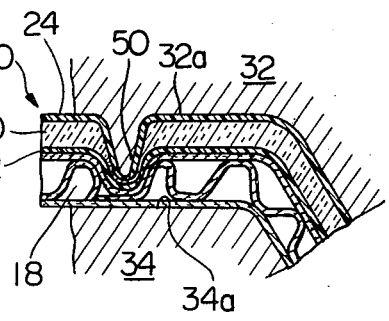
FIG. 5 is a similar view but shows a different region of the same wall covering material.

The male die 32 has a peripheral wall-like and downward protuberance 50 on the surface 32a in a marginal region surrounding the shaped region 32b. This protuberance 50 is tapered with the thickest portion on the surface 32a so as to have a wedge-shaped longitudinal section as shown in FIG. 5. However, this protuberance 50 needs not to be sharp-edged or pointed. It is more preferably that the protuberance 50 is rounded at the top edge or ridge as seen in FIG. 5. The height of the protuberance 50 is larger than the thickness of the laminated layer 30 but slightly smaller than the entire thickness of the multi-layered material produced by the pressing. Accordingly, the laminated layer 30 is forced to sink in the corrugated cardboard substrate 18 in the marginal region as shown in FIG. 5 when the male die 32 is lowered to shape the piled materials, and the substrate 18 is strongly pressed against the surface 34a of the female die 34 in this region. In this state, the wall-like protuberance 50 prevents the permeation of air into the substrate 18 and the porous buffer layer 20 from their peripheral sides.

A simultaneous shaping and adhering operation according to the invention is carried out in the following manner. The female die 34 is heated to have a temperature of about 160° C. on the shaped surface 34b while the male die 32 is heated to keep the temperature on the shaped surface 32b at, for example, about 100° C. The male die 32 is lowered in the usual manner to press the piled materials against the female die 34. The vacuum pump 46 is kept in operation.

As the piled materials are pressed into the cavity 36, the wall-like protuberance 50 of the male die 32 locally squeezes the laminated layer 30 into the substrate 18 without breaking the liner 24 or the buffer layer 20, as shown in FIG. 5. Accordingly, the protuberance 50 not only prevents the inflow of air into the cavity 36 but also serves to firmly clamp the marginal region of the piled materials. The marginal region of the materials can effectively be prevented from being dragged into the shaping cavity 36. As the materials are pressed against the female die 34, the pin-like protuberances 48 intrude into the buffer layer 20 through the substrate 18 as shown in FIG. 4, so that a hole indicated at 52 is formed in the outer liner 18a of the corrugated cardboard substrate 18 around each of the pin-like protuberances 48. Accordingly air is sucked not only from the cavity 36 and the substrate 18 but also from the buffer layer 20 through the holes 42, space 40 and the duct 44. Since the thermoplastic liner 24 is gas impermeable and the wall-like protuberance 50 in the state of FIG. 5 serves as a partition, the voids in the substrate 18 and the buffer layer 20 are evacuated, so that the shaping is facilitated.

The male die 32 is kept in the lowered position for a predetermined period of time to complete the shaping of the materials and melting of the hot-melt sheet 22. Thereafter the male die 32 is raised to part from the shaped materials, continuing the operation of the vacuum pump 46. An upward pulling force may act on the thermoplastic liner 24 due to a sticking tendency of the heated liner 24 to the heated die surface 32a and 32b as described hereinbefore. However, the thermoplastic liner 24 and the buffer layer 20 are protected against separation or attraction by the male die 32 since the shaped product on the female die 34 is firmly attracted to the die surface 34a and 34b by the retained vacuum. The parting of the male die 32, therefore, can be accomplished without separating the liner 24 from the buffer layer 20, (or the laminated layer 30 from the substrate 18), causing the wrinkles or cracks in the liner 24, or deforming the shaped product. Thereafter the operation of the vacuum pump 46 is stopped and the shaped product is removed from the female die 34. The presence of a groove on the front side of the shaped product resulting from the intrusion of the wall-like protuberance 50 does not practically damage the quality of the product since the marginal region is cut away as is usual in the production of a shaped wall-covering material of the corrugated cardboard base type. The tiny holes 52 resulting from the intrusion of the pin-like protuberances 48 cannot be recognized from the front (decorative) side of the wall covering material and hence are not regarded as a substantial defect.

It will be understood that both the employment of the movable male die 32 and the stationary female die 34 in FIG. 3 and the arrangement of the piled materials with the substrate 18 on the female die 34 are merely exemplary. Whichever of male and female dies may be made as a movable die. The substrate 18 may be contacted with either a male die or a female die. A requisite in these regards is only that a die which contacts the substrate 18 has air passages as represented by the holes 42 and the space 40 in FIG. 3 in order to attract the pressed materials to this die by suction of air. Furthermore, it is permissible to form a wall-like protuberance on a die which contacts the substrate instead of, or additionally to, the protuberance 50 formed on a die (32) which contacts the outer liner 24. Also it will be understood that the method of the invention can be applicable to the production of a substantially flat wall covering material of the described type.

As is optional in conventional methods, the adhesion of the thermoplastic liner 24 to the buffer layer 20 may be performed simultaneously with the press-forming. The adhesion of the buffer layer 20 to the substrate 18 is not necessarily accomplished by the use of the hot-melt sheet 22 but may alternatively be done using an adhesive.

As will have been understood from the foregoing description, the objects of the invention are fully accomplished by the attraction of the piled materials to one die by a unique evacuation technique. In addition to the prevention of the attraction of the thermoplastic liner or the buffer layer to the other die at parting of the dies, firm holding of a marginal region of the piled materials by the wall-like protuberance and the vacuum attraction of the materials to the former die are quite favorable to the realization of a stable and precise shaping. Accordingly the method of the invention can give high quality products even when a wall covering material is designed to be produced by a complicated shaping and/or deep drawing process.

What is claimed is:

1. A method of producing a multi-layered and shaped wall covering material which is composed of a substrate of corrugated cardboard of fibrous materials, a heat-insulating and cushioning layer of a porous material adhered onto one side of the substrate and an outer liner of a thermoplastic resin coated on the outer surface of the cushioning layer, the method comprising the steps of:

setting the substrate, the cushioning layer and the outer liner in an orderly piled arrangement, with adhesive materials interposed between the substrate and the cushioning layer and the outer liner, in a hot-press having a male die and a female die movable relative to each other, one of the male and female dies facing the substrate having a plurality of holes formed therein so as to establish fluid communication between a shaped surface thereof and a separate suction means:

heating the male and female dies to temperatures suitable for shaping of the piled materials and function of the adhesive materials;

press-shaping the piled materials between the male and female dies and simultaneously adhering the cushioning layer to both the substrate and the outer liner;

sucking air through said holes while the substrate is in contact with said shaped surface of said one die to attract the piled materials to said one die by perforating the substrate from the outside to suck air from voids in the substrate and the cushioning layer when air is sucked through said holes by preliminarily forming a plurality of pin-like protuberances on said shaped surface of said one die, said protuberances being shaped and sized such that a tip portion of each of said protuberances perforates the substrate and intrudes into the cushioning layer without arriving at the outer liner to allow the outflow of air from voids in the cushioning layer to voids in the substrate through perforations formed in the substrate by said protuberances; and parting the other of the male and female dies from the outer liner, the suction of air being continued until said outer die parts from the outer liner.

2. A method as claimed in claim 1, wherein each of said protuberances has a tip portion of a conical shape and is saw-toothed in longitudinal section.

3. A method as claimed in claim 1, wherein a hot-melt sheet is interposed between the substrate and the cushioning layer as an adhesive material.

4. A method as claimed in claim 1, wherein the outer liner is adhered to the cushioning layer in advance of laying the cushioning layer on the substrate set in the hot-press.

5. A method as claimed in claim 1, further comprising the step of squeezing at least one of the cushioning layer and the substrate into the other in a marginal region along the entire periphery of the piled materials at the press-shaping step by preliminarily forming at least one wall-like protuberance on a shaped surface of at least one of the male and female dies, said at least one wall-like proturberance being shaped and sized such that said at least one wall-like protuberance and the squeezed region of the piled materials prevent the inflow of air from the atmosphere into voids in the cushioning layer and the substrate across peripheral sides of the piled materials when air is sucked from said voids.

6. A method as claimed in claim 5, wherein the substrate contacts the female die, said at least one wall-like protuberance being formed only on a shaped surface of the male die.

7. A method as claimed in claim 5, wherein said at least one wall-like protuberance is tapered with the thickest portion on the surface of the die and has a rounded ridge.

* * * * *